US009647886B2

(12) United States Patent
Drake

(10) Patent No.: US 9,647,886 B2
(45) Date of Patent: May 9, 2017

(54) UPDATE APPLIANCE COMMUNICATION SETTINGS TO COMPENSATE FOR TEMPERATURE FLUCTUATIONS

(71) Applicant: General Electric Company, Schenectady, NY (US)

(72) Inventor: Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 245 days.

(21) Appl. No.: 14/181,805

(22) Filed: Feb. 17, 2014

(65) Prior Publication Data

US 2015/0236928 A1    Aug. 20, 2015

(51) Int. Cl.
  *G06F 15/16*    (2006.01)
  *H04L 12/24*    (2006.01)
  *H04L 12/26*    (2006.01)

(52) U.S. Cl.
  CPC ...... *H04L 41/0816* (2013.01); *H04L 43/0829* (2013.01)

(58) Field of Classification Search
  CPC .................................................. H04L 41/0816
  USPC ........................................................ 709/224
  See application file for complete search history.

(56) References Cited

U.S. PATENT DOCUMENTS

| | | | |
|---|---|---|---|
| 5,113,416 A | 5/1992 | Lindell | |
| 6,249,726 B1* | 6/2001 | Burke, II | B60H 1/3225 192/150 |
| 6,563,790 B1* | 5/2003 | Yu | H04L 47/10 370/230 |
| 6,643,611 B1* | 11/2003 | Ito | F24F 11/0086 702/184 |
| 7,369,510 B1* | 5/2008 | Wong | H04L 1/20 370/252 |
| 7,860,018 B2 | 12/2010 | Raith | |
| 8,494,010 B2 | 7/2013 | Suzuki | |
| 8,994,556 B2* | 3/2015 | Lundy | G08B 25/009 340/539.11 |
| 2001/0002786 A1* | 6/2001 | Najima | B60L 3/04 320/108 |
| 2002/0095269 A1* | 7/2002 | Natalini | H04L 12/2803 702/188 |

(Continued)

*Primary Examiner* — El Hadji Sall
*Assistant Examiner* — S M Z Islam
(74) *Attorney, Agent, or Firm* — Dority & Manning, P.A.

(57) ABSTRACT

Systems and methods for updating appliance communication settings to compensate for temperature fluctuations are provided. In particular, an appliance that includes one or more data communication components that provide wireless communication functionality can monitor one or more characteristics describing data communication failures experienced by the one or more data communication components. When the monitored characteristics indicate that the appliance is experiencing an increased rate of communication failure, the appliance can log the temperature conditions at the data communication components. Periodically, the appliance can analyze the logged temperatures to identify one or more temperature ranges associated with increased communication failure. The appliance can then update one or more communication settings associated with such temperature ranges so as to compensate for anticipated temperature fluctuations.

19 Claims, 4 Drawing Sheets

(56) References Cited

U.S. PATENT DOCUMENTS

| | | | |
|---|---|---|---|
| 2006/0039280 A1* | 2/2006 | Anandakumar | H04B 7/06 370/229 |
| 2008/0017723 A1* | 1/2008 | Johnson | F24F 1/027 236/51 |
| 2011/0096628 A1* | 4/2011 | Golparian | G01V 1/223 367/77 |
| 2012/0287943 A1 | 11/2012 | Hagimura et al. | |
| 2013/0131883 A1* | 5/2013 | Yamada | H02J 3/14 700/295 |
| 2013/0238048 A1* | 9/2013 | Almendinger | A61N 1/3787 607/40 |

* cited by examiner

UPDATE APPLIANCE COMMUNICATION SETTINGS TO COMPENSATE FOR TEMPERATURE FLUCTUATIONS

FIELD OF THE INVENTION

The present disclosure relates generally to appliance communication settings. More particularly, the present disclosure is directed to systems and methods for updating appliance communication settings to compensate for temperature fluctuations.

BACKGROUND OF THE INVENTION

Due to recent advancements in technology, home appliances are increasingly including "smart" features that are capable of performing intelligent or complex tasks in addition to their traditional functionality.

As an example, certain appliances can engage in wireless communication over a local or wide area network. For example, the appliances can include one or more data communication components for transmission and/or reception of data using radio frequency signals.

Using such wireless communication capabilities, the appliances can provide additional, advanced features, such as, for example, the ability to adjust appliance settings remotely. As another example, wireless communication can be used to communicate with various other appliances or devices included in the same household to provide an enhanced user experience, to reduce energy usage, or other smart features.

However, because appliances often engage in household tasks associated with increased or decreased temperatures, the data communication components can be subjected to significant temperature fluctuations.

As an example, in the instance that the appliance is an oven or other cooking apparatus, the data communication components (e.g. modem, antenna, associated circuitry, etc.) may continually be subjected to fluctuations in temperature from about room temperature to an elevated temperature associated with cooking operations. As another example, appliances located outdoors or in a home garage may be subjected to high temperatures during the summer and low temperatures during the winter.

It has been recognized that significant temperature fluctuations or certain temperature ranges can greatly affect the performance of various data communication components. In particular, as various data communication components heat or cool, their physical or electrical properties may correspondingly be affected, thereby drastically changing the tuning of the data communication circuits.

As a result, the data communication components may experience an increased level of communication failures. For example, an increased number or percentage of communication packets may be lost or otherwise failed to properly communicate and, therefore, the data communication components may have to engage in an increased number of retries.

Thus, if the data communication settings or operations do not take into account such variations, then communication quality can be degraded or otherwise rendered inoperable.

Therefore, a need exists for systems and methods for updating appliance communication settings so as to compensate for temperature fluctuations.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a method for updating appliance communication settings to compensate for temperature fluctuations. The method includes monitoring, by an appliance over a period of time, temperature conditions at one or more data communication components included in the appliance. The method includes monitoring, by the appliance over the period of time, one or more characteristics describing data communication failures experienced by the one or more data communication components. The method includes, determining, by the appliance based at least in part on the monitored temperature conditions and the monitored characteristics describing data communication failures, at least one range of temperatures at which the data communication components experience increased data communication failures. The method includes adjusting, by the appliance, one or more data communication settings associated with the at least one range of temperatures.

Another aspect of the present disclosure is directed to a method for updating appliance communication settings to compensate for temperature fluctuations. The method includes determining, by an appliance, when a packet loss rate or a number of communication retries exceeds a threshold value. The method includes logging, by the appliance, a temperature associated with one or more data communication components included in the appliance when it is determined that the packet loss rate or the number of communication retries exceeds the threshold value. The method includes analyzing, by the appliance, the logged temperatures to identify at least one temperature range associated with increased packet loss rate or increased number of communication retries. The method includes adjusting, by the appliance, one or more data communication settings associated with the at least one range of temperatures.

Another aspect of the present disclosure is directed to an appliance. The appliance includes one or more data communication components. The appliance includes a temperature sensor positioned adjacent to the one or more data communication components and configured to provide data indicating a temperature at the one or more data communication components. The appliance is configured to perform operations. The operations include determining when a packet loss rate or a number of communication retries exceeds a threshold value. The operations include logging the temperature at the one or more data communication components when it is determined that the packet loss rate or the number of communication retries exceeds the threshold value. The operations include analyzing the logged temperatures to identify at least one temperature range associated with increased packet loss rate or increased number of communication retries. The operations include adjusting one or more data communication settings associated with the at least one range of temperatures.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
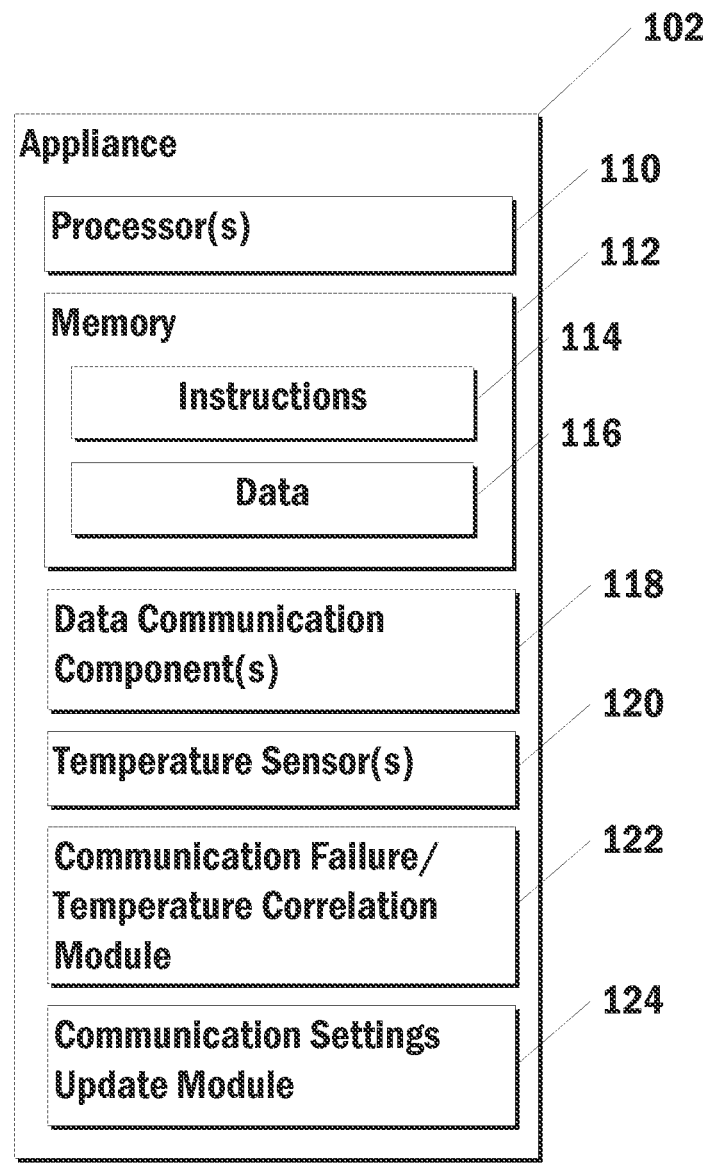
FIG. 1 depicts an example appliance according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for updating appliance communication settings to compensate for temperature fluctuations. In particular, an appliance that includes one or more data communication components that provide wireless communication functionality can monitor one or more characteristics describing data communication failures experienced by the one or more data communication components. For example, the appliance can monitor a packet loss rate, a retry rate, or other suitable characteristics.

When the monitored characteristics indicate that the appliance is experiencing an increased rate of communication failure, the appliance can log the temperature conditions at the data communication components. The appliance can periodically analyze the logged temperatures to identify one or more temperature ranges correlated with increased communication failure.

The appliance can then update one or more communication settings associated with such temperature ranges. For example, the communication settings can include one or more of a length of a retry period, a maximum number of retries, or a retry rate.

Thus, when it is thereafter determined that the temperature at the data communication components is within one of the identified temperature ranges, the data communication components can be operated according to the updated or adjusted communications settings.

In such fashion, varying performance of various data communication components due to significant temperature fluctuations can be accommodated or otherwise compensated for using periodic updates of communication settings over the lifespan of the appliance.

With reference now to the FIGS., exemplary embodiments of the present disclosure will now be discussed in further detail. FIG. 1 depicts an example appliance 102 according to an example embodiment of the present disclosure.

Appliance 102 can be any suitable type of appliance, including, but not limited to, a dishwasher, a microwave, a washing machine, a dryer, an oven, a refrigerator, a heater, a home energy manager, or any other type of appliance.

Appliance 102 can include one or more processors 110, a memory 112, a display 118, and a network interface 120. The processor(s) 110 can be any suitable processing device, such as a microprocessor, microcontroller, integrated circuit, or other suitable processing device.

The memory 112 can include any suitable storage media, including, but not limited to, non-transitory computer-readable media, RAM, ROM, hard drives, flash drives, accessible databases, or other memory devices. The memory 112 can store information accessible by processor(s) 110, including instructions 114 that can be executed by processor(s) 110 to control various components of appliance 102 to provide appliance functionality. Memory 112 can also store various forms of other data 116.

Appliance 102 can include one or more data communication components 118. In some implementations, appliance 102 can operate data communication components 118 to engage in communication with other devices by transmitting and receiving radio frequency signals. Thus, as examples, data communication components 118 can include, but is not limited to, a wireless access point, a router, a modem, transmitters, receivers, ports, controllers, antennas, or other suitable components and associated circuitry.

Appliance 102 can also include one or more temperature sensors 120. In particular, temperature sensors 120 can be positioned so as to sense a temperature existing ambient to the data communication components 118. In some implementations, temperature sensors 120 are located on the same circuit board with the data communication components 118.

According to an aspect of the present disclosure, Appliance 102 can operate to update one or more of its communication settings to compensate for temperature fluctuations. In particular, appliance 102 can include a communication failure/temperature correlation module 122 and a communication settings update module 124.

It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

Appliance 102 can implement communication failure/temperature correlation module 122 to identify one or more correlations between increased amounts of communication failures and one or more temperature ranges. As an example, in some implementations, communication failure/temperature correlation module 122 can be implemented to log values for one or more characteristics describing communication failures versus temperature over one or more observation periods. The correlation module 122 can then be implemented to analyze the logged values to identify the one or more correlations.

Appliance 102 can implement communication settings update module 124 to update one or more communication system settings of appliance 102. As an example, in some implementations, communications settings update module 124 can be implemented to update one or more settings associated with various temperature ranges identified by correlation module 122.

Figure 2:
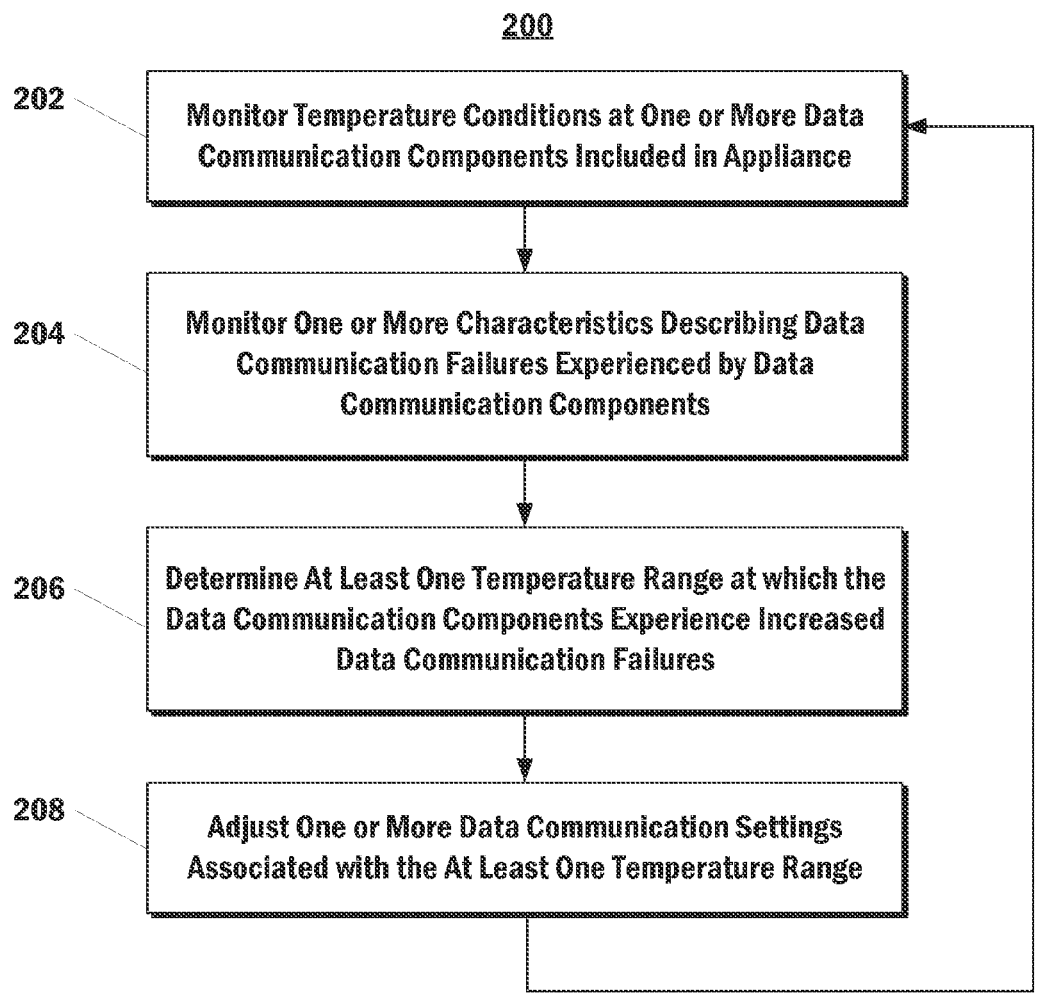
FIG. 2 depicts a flow chart of an example method for updating appliance communication settings to compensate for temperature fluctuations according to an example embodiment of the present disclosure.
Figure 3:
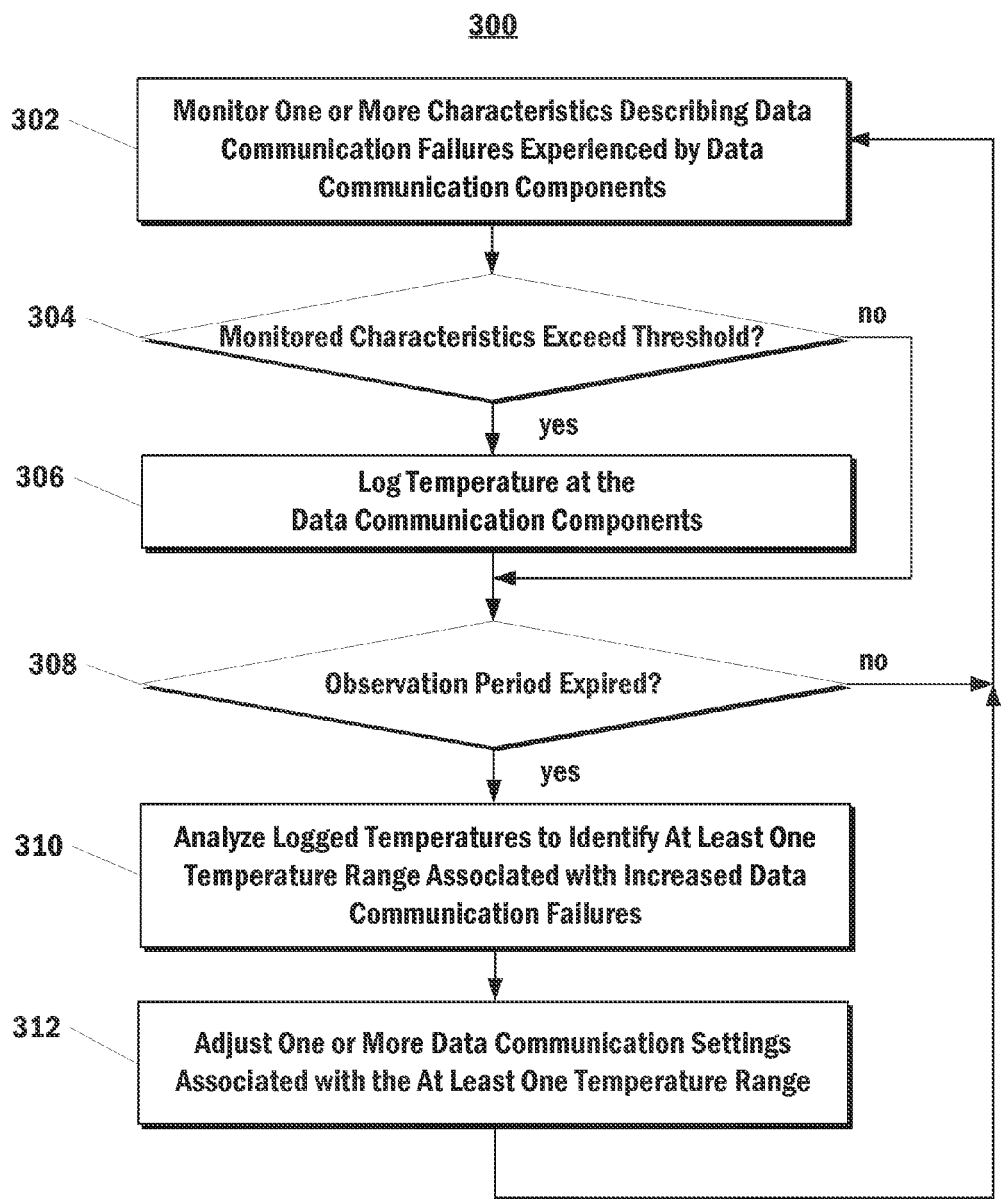
FIG. 3 depicts a flow chart of an example method for updating appliance communication settings to compensate for temperature fluctuations according to an example embodiment of the present disclosure.
Figure 4:
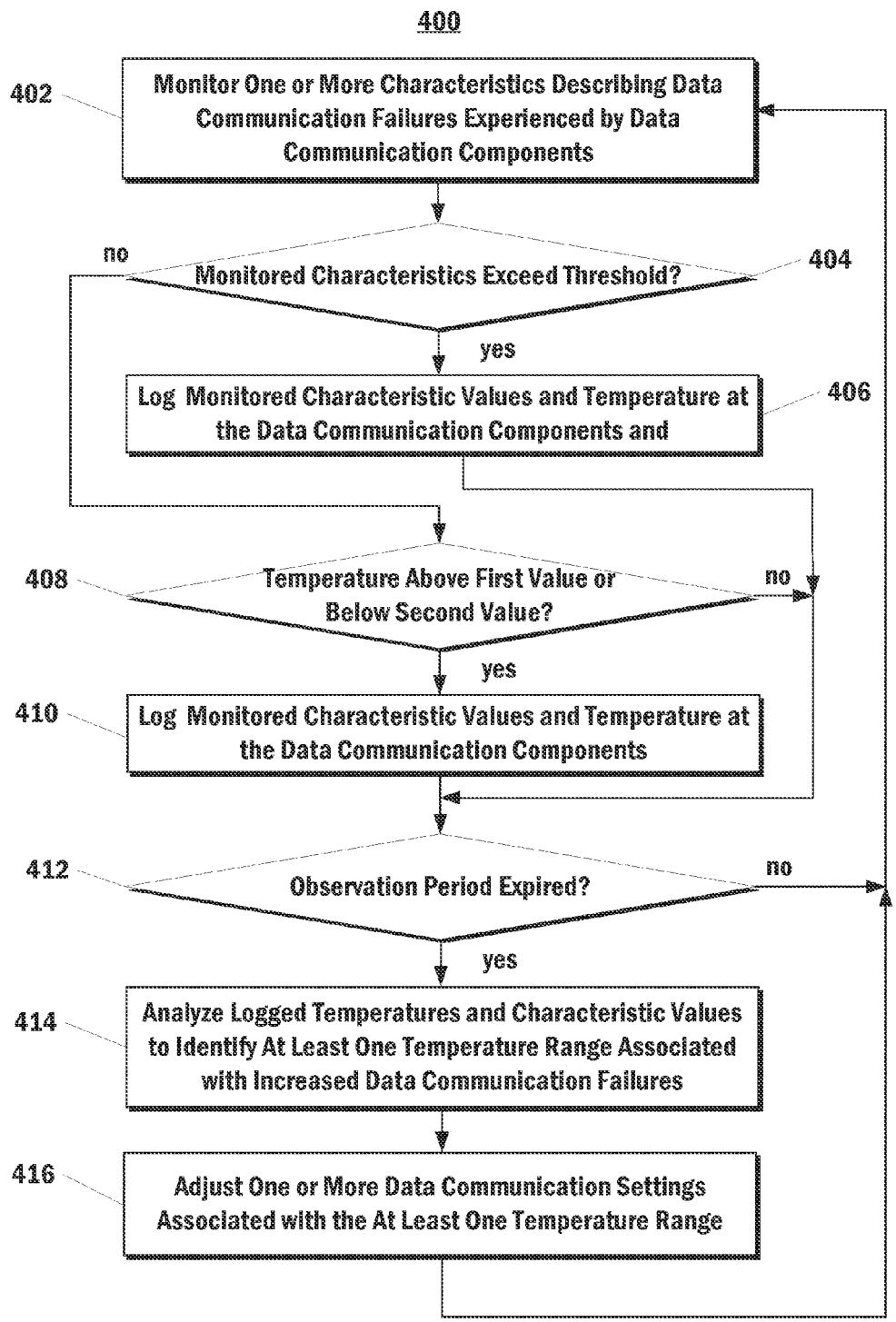
FIG. 4 depicts a flow chart of an example method for updating appliance communication settings to compensate for temperature fluctuations according to an example embodiment of the present disclosure.

As another example, in some implementations, correlation module 122 and communication settings update module 124 can be implemented by appliance 102 to perform aspects of method (200) of FIG. 2, method (300) of FIG. 3, and method (400) of FIG. 4.

FIG. 2 depicts a flow chart of an example method (200) for updating appliance communication settings to compensate for temperature fluctuations according to an example embodiment of the present disclosure. Method (200) can be performed by any suitable appliance, including, for example, appliance 102 of FIG. 1.

In addition, FIG. 2 depicts steps performed in a particular order for purposes of illustration and discussion. Those of ordinary skill in the art, using the disclosures provided herein, will understand that the various steps of method (200) can be omitted, adapted, and/or rearranged in various ways without departing from the scope of the present disclosure.

At (202) temperature conditions at one or more data communication components included in an appliance can be monitored. For example, a temperature sensor located proximate to the one or more data communication components can output data describing the local temperature conditions.

At (204) one or more characteristics describing data communication failures experienced by the data communication components can be monitored. For example, the one or more characteristics can include a rate of packet loss, a quantity of packets lost, an average number of retries necessary to successfully send or receive a packet, a communication retry rate, or other suitable characteristics describing data communication failures experienced by the data communication components. In some implementations, the values for the above noted characteristics can be computed using a moving average or a moving window average.

At (206) at least one temperature range at which the data communication components experience increased data communication failures can be determined. For example, at (206) the monitored characteristics describing data communication failures can be compared corresponding temperature conditions to identify one or more temperature ranges at which the monitored characteristics describing data communication failures exhibit increased values.

At (208) one or more data communication settings associated with the at least one temperature range can be adjusted. For example, the one or more data communication settings can include, but are not limited to, a length of a retry period, a maximum number of retries, a retry rate, whether packet losses are designated as valid or invalid, a retry mechanism, a retry algorithm, which communications protocol is used, or any other suitable communication settings.

After (208), method (200) can return to (202) and begin again. More particularly, method (200) can be performed periodically over the lifespan of the appliance. In such fashion, the appliance communication settings can be dynamically updated as the performance or physical characteristics of the appliance change over time (e.g. as a result of exposure to repeated temperature fluctuations).

FIG. 3 depicts a flow chart of an example method (300) for updating appliance communication settings to compensate for temperature fluctuations according to an example embodiment of the present disclosure. Method (300) can be performed by any suitable appliance, including, for example, appliance 102 of FIG. 1.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways without departing from the scope of the present disclosure.

At (302) one or more characteristics describing data communication failures experienced by data communication components can be monitored. For example, the one or more characteristics can include a rate of packet loss, a quantity of packets lost, an average number of retries necessary to successfully send or receive a packet, a communication retry rate, or other suitable characteristics describing data communication failures experienced by the data communication components. In some implementations, the values for the above noted characteristics can be computed using a moving average or a moving window average.

At (304) it can be determined if the one or more characteristics monitored at (302) exceed one or more threshold values. If it is determined at (304) that the monitored characteristics do not exceed the threshold values, then method (300) can proceed to (308). However, if it is determined at (304) that the monitored characteristics do exceed the threshold values, then method (300) can proceed to (306).

At (306) the temperature at the data communication components can be logged. Thus, whenever the one or more characteristics exceed their corresponding threshold value (e.g. when the data communication components are experiencing an increased incidence of data communication failures) the temperature at the data communication components can be logged.

At (308) it can be determined whether an observation period has expired. In particular, as discussed above, the appliance can periodically update its communications settings based on recently observed communication failure characteristics. As such, update procedures can be periodically performed after data is collected over a periodic observation period. Therefore, at (308) it can be determined whether the observation period has expired or whether method (300) should return to (302) and continue to monitor the one or more characteristics describing data communication failures.

It if is determined at (308) that the observation period has not expired, then method (300) can return to (302) and continue to monitor the one or more characteristics describing data communication failures. However, if it is determined at (308) that the observation period has expired, then method (300) can proceed to (310).

At (310) the logged temperatures can be analyzed to identify at least one temperature range associated with increased data communication failures. For example, one or more statistical measures can be applied to the logged temperatures to identify a correlation between temperature and communication failures. In particular, in some implementations, the most commonly logged temperature conditions can be identified at (310).

At (312) one or more data communication settings associated with the at least one temperature range can be adjusted. For example, the one or more data communication settings can include, but are not limited to, a length of a retry period, a maximum number of retries, a retry rate, whether packet losses are designated as valid or invalid, a retry mechanism, a retry algorithm, which communications protocol is used, or any other suitable communication settings.

Thereafter, when the temperature observed at the data communication components is included within the temperature range identified at (310), then the data communication components can be operated according to the settings as most recently adjusted at (312). After (312), method (300) can return to (302) and begin again.

FIG. 4 depicts a flow chart of an example method (400) for updating appliance communication settings to compensate for temperature fluctuations according to an example embodiment of the present disclosure. Method (400) can be performed by any suitable appliance, including, for example, appliance 102 of FIG. 1.

In addition, FIG. 4 depicts steps performed in a particular order for purposes of illustration and discussion. Those of ordinary skill in the art, using the disclosures provided herein, will understand that the various steps of method (400) can be omitted, adapted, and/or rearranged in various ways without departing from the scope of the present disclosure.

At (402) one or more characteristics describing data communication failures experienced by data communication components can be monitored. For example, the one or more characteristics can include a rate of packet loss, a quantity of packets lost, an average number of retries necessary to successfully send or receive a packet, a communication retry rate, or other suitable characteristics describing data communication failures experienced by the data communication components. In some implementations, the values for the above noted characteristics can be computed using a moving average or a moving window average.

At (404) it can be determined whether the one or more characteristics monitored at (402) exceed one or more threshold values. If it is determined at (404) that the monitored characteristics do exceed the threshold values, then method (400) can proceed to (406).

At (406) the temperature at the data communication components can be logged along with the values of the monitored characteristics. Thus, whenever the one or more characteristics exceed the corresponding threshold value (e.g. when the data communication components are experiencing an increased incidence of data communication failures) the temperature at the data communication components can be logged along with the corresponding values of the monitored characteristics. After (406) method (400) can proceed to (412).

However, returning to (404), if it is determined at (404) that the monitored characteristics do not exceed the threshold values, then method (400) can proceed to (408).

At (408) it can be determined whether the temperature at the data communication components is above a first temperature value or below a second temperature value. If it is determined at (408) that the temperature at the data communication components is neither above the first temperature value nor below the second temperature value, then method (400) can proceed to (412).

However, if it is determined at (408) that that the temperature at the data communication components is either above the first temperature value or below the second temperature value, then method (400) can proceed to (410).

At (410) the values of the monitored characteristics can be logged along with the corresponding temperature at the data communication components. Thus, whenever the temperature at the data communication components exceeds the first value or drops below the second value, then the values of the monitored characteristics can be logged along with the corresponding temperatures at the data communication components.

In such fashion, data is collected when temperatures are outside the normal operating ranges, in addition to the collection of data at times when increased communication failures are experienced. Therefore, a more complete data picture can be collected. After (410) method (400) can proceed to (412).

At (412) it can be determined whether an observation period has expired. In particular, as discussed above, the appliance can periodically update its communications settings based on recently observed communication failure characteristics. As such, update procedures can be periodically performed after data is collected over a periodic observation period. Therefore, at (412) it can be determined whether the observation period has expired or whether method (400) should return to (402) and continue to monitor the one or more characteristics describing data communication failures.

It if is determined at (412) that the observation period has not expired, then method (400) can return to (402) and continue to monitor the one or more characteristics describing data communication failures. However, if it is determined at (412) that the observation period has expired, then method (400) can proceed to (414).

At (414) the logged temperature and monitored characteristic data can be analyzed to identify at least one temperature range associated with increased data communication failures. For example, one or more statistical measures can be applied to the logged data to identify one or more correlations between temperature and communication failures.

At (416) one or more data communication settings associated with the at least one temperature range can be adjusted. For example, the one or more data communication settings can include, but are not limited to, a length of a retry period, a maximum number of retries, a retry rate, whether packet losses are designated as valid or invalid, a retry mechanism, a retry algorithm, which communications protocol is used, or any other suitable communication settings.

Thereafter, when the temperature observed at the data communication components is included within the temperature range identified at (414), then the data communication components can be operated according to the settings as most recently adjusted at (416). After (416), method (400) can return to (402) and begin again.

The technology discussed herein references databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computing processes discussed herein may be implemented using a single computing component or multiple computing components working in combination. Databases and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for updating appliance communication settings to compensate for temperature fluctuations, the method comprising:
    monitoring, by an appliance over a period of time, temperature conditions at one or more data communication components included in the appliance, wherein the data communication component is configured for transmission or reception of data using radio frequency signals;
    monitoring, by the appliance over the period of time, one or more characteristics describing data communication failures experienced by the one or more data communication components, wherein the data communication failures comprise one or more of the following: rate of packet loss, a quantity of packets lost, an average number of retries necessary to successfully send or receive a packet, and a communication retry rate;
    determining, by the appliance based at least in part on the monitored temperature conditions and the monitored characteristics describing data communication failures, a correlation between the monitored temperature conditions and the monitored characteristics describing data communication failures, wherein the correlation comprises at least one range of temperatures at which the data communication components experience increased data communication failures;
    adjusting, by the appliance, one or more data communication settings associated with the at least one range of temperatures, wherein the adjusted one or more data communication settings compensate for the data communication failures;
    determining, by the appliance, that the temperature conditions at the one or more data communication components are within the at least one range of temperatures; and
    while the temperature conditions at the one or more data communication components are within the at least one range of temperatures, operating, by the appliance, the one or more data communication components according to the adjusted one or more communication settings to communicate with at least one other device.

2. The method of claim 1, wherein determining, by the appliance based at least in part on the monitored temperature conditions and the monitored characteristics describing data communication failures, the correlation between the monitored temperature conditions and the monitored characteristics describing data communication failures comprises:
    determining, by the appliance, when the one or more characteristics describing data communication failures exceed a threshold value; and
    when it is determined that the one or more characteristics describing data communication failures exceed the threshold value, logging, by the appliance, the temperature conditions.

3. The method of claim 2, wherein determining, by the appliance based at least in part on the monitored temperature conditions and the monitored characteristics describing data communication failures, the correlation between the monitored temperature conditions and the monitored characteristics describing data communication failures further comprises analyzing, by the appliance, the logged temperature conditions to determine the at least one range of temperatures.

4. The method of claim 1, wherein:
    the appliance periodically performs the steps of determining the correlation and adjusting the one or more data communication settings; and
    the period of time comprises a moving window of time associated with the periodic performance of the steps of determining the correlation and adjusting the one or more data communication settings.

5. The method of claim 1, wherein the one or more characteristics describing data communication failures experienced by the one or more data communication components comprises a rate of packet loss associated with the one or more data communication components.

6. The method of claim 1, wherein the one or more characteristics describing data communication failures experienced by the one or more data communication components comprises a quantity of packets lost.

7. The method of claim 1, wherein the one or more characteristics describing data communication failures experienced by the one or more data communication components comprises an average number of retries necessary to successfully send or receive a packet.

8. The method of claim 1, wherein the one or more characteristics describing data communication failures experienced by the one or more data communication components comprises a communication retry rate.

9. The method of claim 1, wherein the one or more data communication settings comprises a length of a retry period.

10. The method of claim 1, wherein the one or more data communication settings comprises a maximum number of retries.

11. The method of claim 1, wherein the one or more data communication settings comprises a retry rate.

12. The method of claim 1, wherein the appliance comprises a cooking product.

13. A method for updating appliance communication settings to compensate for temperature fluctuations, the method comprising:
    determining, by an appliance, when a packet loss rate or a number of communication retries exceeds a threshold value for one or more signals transmitted or received by one or more data communication components configured for transmission or reception of data using radio frequency signals;
    logging, by the appliance, a temperature associated with one or more data communication components included in the appliance when it is determined that the packet loss rate or the number of communication retries exceeds the threshold value;
    analyzing, by the appliance, the logged temperatures to identify a correlation between the temperature associated with the one or more data communication components and increased packet loss rate or increased number of communication retries, wherein the correlation comprises at least one temperature range associated with the increased packet loss rate or the increased number of communication retries;

adjusting, by the appliance, one or more data communication settings associated with the at least temperature range, wherein the adjusted one or more data communication settings compensate for the increased packet loss rate or the increased number of communication retries;

determining, by the appliance, that the temperature associated with the one or more data communication components is within the at least one temperature range associated with the increased packet loss rate or the increased number of communication retries; and while the temperature associated with the one or more data communication components is within the at least one temperature range, operating, by the appliance, the one or more data communication components according to the adjusted one or more communication settings to communicate with at least one other device.

14. The method of claim 13, further comprising:

determining, by the appliance, when the temperature associated with the one or more data communication components is above a first temperature value or below a second temperature value, the first temperature value greater than the second temperature value; and logging, by the appliance, a current packet loss rate or a current number of communication retries when it is determined that the temperature associated with the one or more data communication components is above the first temperature value or below the second temperature value;

wherein analyzing, by the appliance, the logged temperatures to identify the correlation between the temperature associated with the one or more data communication components and increased packet loss rate or increased number of communication retries comprises analyzing, by the appliance, the logged temperatures and the logged packet loss rate or number of communication retries to identify the correlation between the temperature associated with the one or more data communication components and increased packet loss rate or increased number of communication retries.

15. The method of claim 13, wherein the one or more data communication settings comprises one or more of a length of a retry period, a maximum number of retries, or a retry rate.

16. The method of claim 13, wherein:

adjusting, by the appliance, the one or more data communication settings comprises periodically adjusting, by the appliance, the one or more data communication settings; and analyzing, by the appliance, the logged temperatures to identify the correlation between the temperature associated with the one or more data communication components and increased packet loss rate or increased number of communication retries comprises periodically analyzing, by the appliance, only those temperatures associated with a moving window of time to identify the correlation, such that the one or more data communication settings are dynamically updated to compensate for appliance data communication performance parameters that change over the lifetime of the appliance.

17. An appliance comprising:

one or more data communication components configured for transmission or reception of data using radio frequency signals;

a temperature sensor positioned adjacent to the one or more data communication components and configured to provide data indicating a temperature at the one or more data communication components;

wherein the appliance is configured to:
  determine when a packet loss rate or a number of communication retries for one or more signals transmitted or received by the one or more data communication components exceeds a threshold value;
  log the temperature at the one or more data communication components when it is determined that the packet loss rate or the number of communication retries exceeds the threshold value;
  analyze the logged temperatures to identify a correlation between the temperature associated with the one or more data communication components and increased packet loss rate or increased number of communication retries, wherein the correlation comprises at least one temperature range associated with the increased packet loss rate or the increased number of communication retries;
  adjust one or more data communication settings associated with the at least one temperature range, wherein the adjusted one or more data communication settings compensate for the increased packet loss rate or the increased number of communication retries;
  determine that the temperature associated with the one or more data communication components is within the at least one temperature range associated with the increased packet loss rate or the increased number of communication retries; and
  while the temperature associated with the one or more data communication components is within the at least one temperature range, operate the one or more data communication components according to the adjusted one or more communication settings to communicate with at least one other device.

18. The appliance of claim 17, wherein the one or more data communication settings comprises one or more of a length of a retry period, a maximum number of retries, or a retry rate.

19. The appliance of claim 17, wherein the appliance is further configured to:

determine when the temperature at the one or more data communication components is above a first temperature value or below a second temperature value; and log a current packet loss rate or a current number of communication retries when it is determined that the temperature associated with the one or more data communication components is above the first temperature value or below the second temperature value.

* * * * *